United States Patent
Cooley et al.

(10) Patent No.: US 8,255,993 B2
(45) Date of Patent: Aug. 28, 2012

(54) METHODS AND SYSTEMS FOR DETERMINING FILE CLASSIFICATIONS

(75) Inventors: Shaun Cooley, El Segundo, CA (US); Petrus J. Viljoen, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 987 days.

(21) Appl. No.: 12/144,189

(22) Filed: Jun. 23, 2008

(65) Prior Publication Data

US 2010/0017877 A1    Jan. 21, 2010

(51) Int. Cl.
*G06F 21/00* (2006.01)
(52) U.S. Cl. .......................................................... 726/22
(58) Field of Classification Search ..................... 726/22
See application file for complete search history.

(56) References Cited

U.S. PATENT DOCUMENTS

| | | | |
|---|---|---|---|
| 2002/0174139 A1* | 11/2002 | Midgley et al. ............... | 707/204 |
| 2005/0021994 A1* | 1/2005 | Barton et al. ................. | 713/200 |
| 2005/0223239 A1* | 10/2005 | Dotan ............................ | 713/188 |
| 2007/0038677 A1* | 2/2007 | Reasor et al. ................. | 707/200 |
| 2008/0147612 A1* | 6/2008 | Gryaznov ........................ | 707/3 |
| 2009/0210944 A1* | 8/2009 | Greiner ........................... | 726/24 |

OTHER PUBLICATIONS

Search Report and Written Opinion Received in related International Application No. PCT/US2009/047505.

* cited by examiner

*Primary Examiner* — William Goodchild
(74) *Attorney, Agent, or Firm* — Advantedge Law Group (57) ABSTRACT

A computer-implemented method for determining file classifications. The method may include determining identification information of a first file stored on a first computing system. The method may also include querying a second computing system for classification information by sending the identification information of the first file to the second computing system. The first computing system may receive, in response to the query, identification information of a second file. The first computing system may also receive the classification information. The classification information may indicate that the first file and second file are trusted. The first computing system may use the identification information of the second file to determine that the second file is stored on the first computing system. The first computing system may also apply the classification information to the first and second files by excluding the first and second files from a security scan.

20 Claims, 7 Drawing Sheets

METHODS AND SYSTEMS FOR DETERMINING FILE CLASSIFICATIONS

BACKGROUND

Consumers and businesses increasingly rely on computers to store sensitive data. Consequently, malicious programmers seem to continually increase their efforts to gain illegitimate control and access to others' computers. Computer programmers with malicious motivations have created and continue to create viruses, Trojan horses, worms, and other programs meant to compromise computer systems and data belonging to other people. These malicious programs are often referred to as malware.

Security software companies are combating the growing tide of malware by creating and deploying malware signatures (e.g., hashes that identify malware) to their customers on a regular basis. For example, security software companies may send malware signature updates to their customers multiple times a day. By frequently updating malware signatures, security software companies may help their customers secure their computers against new and changing threats.

Each time a customer receives a malware definition update, the customer's computer may need to rescan numerous files to assure no malware is running on the computer. Consequently, customers' computers may take a performance hit each time they receive a malware signature update. Performance loss on customers' computers and networks increases as the size and frequency of signature updates increases. The performance loss may result in a negative customer experience.

Security software developers have tried to decrease the time and network traffic required to perform security scans by skipping known good files (e.g., files that are known to be free from malware). Before skipping a file, the security software typically must identify that the file is legitimate and free from malware. Security software developers have implemented at least two different methods to identify known good files to reduce security scan times.

In a first method, a client machine may keep a database of hashes of known good files. When performing a malware scan, the client machine may query the database to identify known good files. The client machine may then skip the known files, which may allow the scan to complete more quickly. However, maintaining a database of hashes of known good files may not be ideal. Maintaining the database may require frequent updates that increase network traffic. Also, the database may become large and may not provide the hoped-for efficiencies.

In a second method, a client machine may scan a drive. The client machine may compute hashes for the files stored on the drive and may transmit the hashes to a server. The server may then determine if the hashes correspond to known good files. This technique also has drawbacks. Sending file hashes to a server may create unnecessary client-server communications and may consume too much network bandwidth. Furthermore, many consumer Internet connections are non-symmetric, with the upload bandwidth being much less than the download bandwidth. Therefore, uploading a number of hashes from a customer's computer to a security software server may be a slow, resource-consuming process.

CROSS REFERENCE TO RELATED APPLICATIONS

This disclosure is related to U.S. application Ser. No. 12/130,559, filed May 30, 2008, titled "Methods and Systems For Scanning Files For Malware" and U.S. application Ser. No. 12/130,839, filed May 30, 2008, titled "Systems and Methods for Determining a File Set," the disclosures of each of which are incorporated, in their entirety, by this reference.

SUMMARY

Embodiments of the instant disclosure are directed to increasing security scan speeds by skipping trusted files (i.e., known good files). A security module on a client device (e.g., a first computing system) may attempt to identify trusted files on the client device. In the process of identifying trusted files, the security module may determine identification information of a first file stored on the client device. The security module may determine identification information by computing a digest of the first file. The security module may also determine identification information by identifying a name of a directory where the first file is stored. The security module may query a server (e.g., a second computing system) for classification information by sending the identification information of the first file to the server.

The server may use the identification information to search a classification database for classification information for the first file. For example, the server may search the classification database for a file digest that matches the digest of the first file. In addition to, or instead of, searching for the file digest, the server may search for a directory name in the classification database that matches the directory name included in the identification information. The server may also find one or more additional files that are associated with the directory name. Then, the server may transmit identification information of the additional files to the client device. The server may also transmit classification information for the first file and the additional files to the first computing device.

The classification information may indicate whether the first file and the additional files are trusted. If the files are trusted, the security software on the first computing device may exclude the files from a security scan. By excluding trusted files, the security scan may run more efficiently. Furthermore, embodiments of the present disclosure may reduce the amount of network bandwidth, particularly client-side upload bandwidth, needed to identify trusted files because a client device may only need to upload one file digest to obtain classification information for multiple files. In other embodiments, the client device may send a few file digests to the server, and the server may return classification information for those files and additional files.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

As will be described in greater detail below, the instant disclosure generally relates to systems and methods for determining file classifications for multiple files by sending identification information for one or more files to a server. As detailed below, security software on a client device may query a classification database on a server for classification information of a first file. In response to the request, the server may send the client device classification information for the first file. The server may also send the client device identification information and classification information for one or more additional files that are associated with the first file. The client device may use the classification information to determine whether files on the client device are trusted and can be skipped in a security scan. Embodiments of the instant disclosure may reduce client upstream bandwidth and minimize the number of network round trip requests needed to classify files on a client system. Embodiments of the instant disclosure also provide various other features and advantages.

Figure 1:
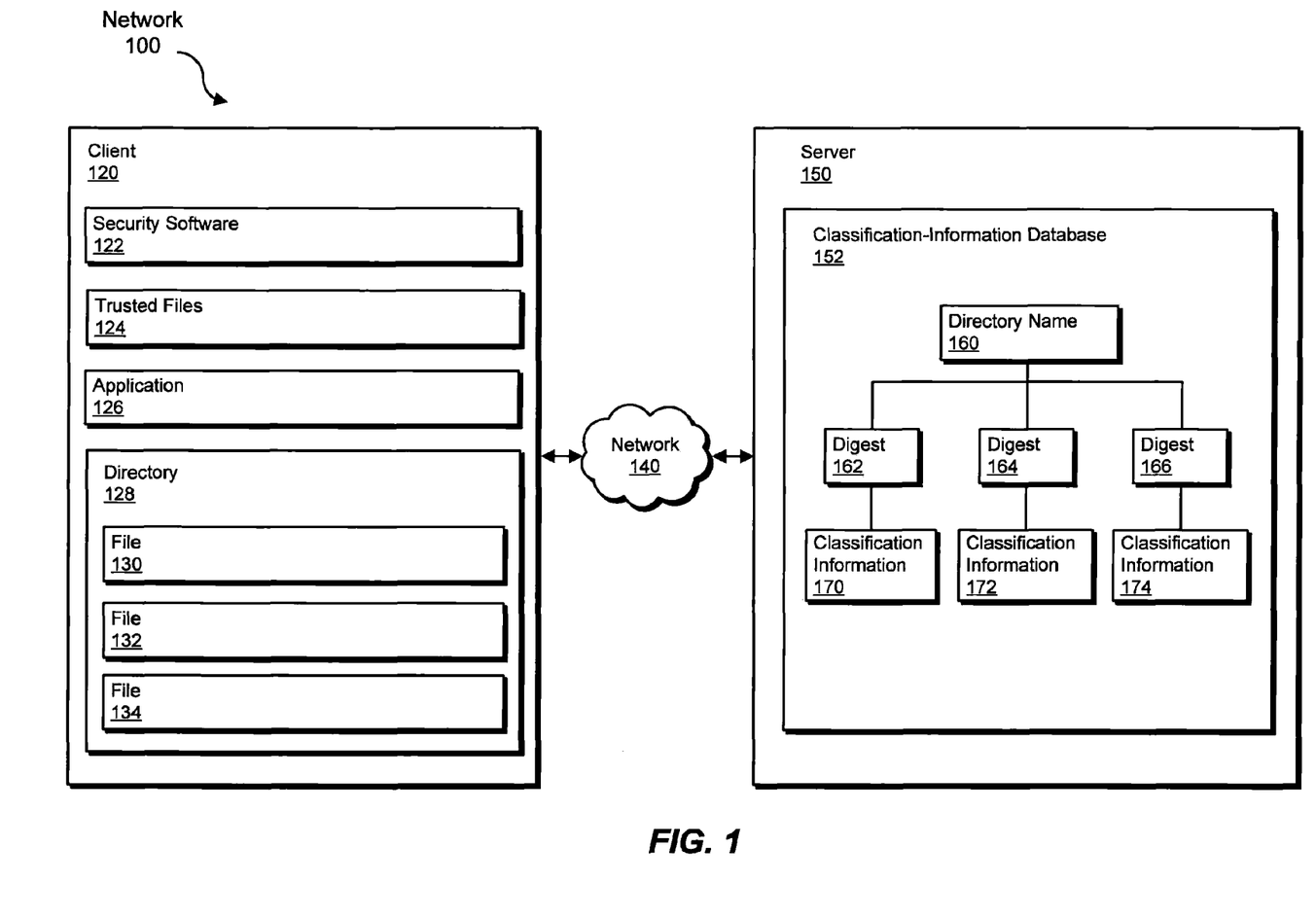
FIG. 1 is a block diagram of an exemplary network for implementing embodiments of the instant disclosure.

FIG. 1 shows a network 100 with a client 120 and a server 150. Client 120 and server 150 may communicate over network 140. Network 140 may be the Internet, a local area network (LAN), a wide area network (WAN), or any other suitable computer network. Client 120 may be a desktop computer, a laptop computer, a mobile computing device, a network computing device, or any other suitable computing device. In some embodiments, client 120 may be referred to as a first computing device. Client 120 may include security software 122, trusted files 124, an application 126, and a directory 128.

Security software 122 may be any module, application, or other computer-executable code programmed to determine identification information of a file and query a second computing system for classification information for the file. Security software 122 may determine which files on client 120 are trusted so that security software 122 (or any other application) can skip the trusted files in security scans. In order to determine whether files on client 120 are trusted, security software 122 may identify a first file, such as file 130, in directory 128. Directory 128 may be a directory in a file system on client 120.

After identifying file 130, security software 122 may determine identification information for file 130. For example, security software 122 may compute a digest for file 130. In other embodiments, security software 122 may identify a pre-computed digest for file 130. Security software 122 may also determine a directory name of directory 128. In some embodiments, the directory name of directory 128 may be a normalized directory path for directory 128. By determining identification information for file 130, security software 122 may be able to request classification information for file 130 by sending the identification information, rather than the entire file 130, to server 150. Typically, identification information for a file may be smaller than the file itself. Thus, sending the identification information for a file may consume less network bandwidth than sending the file itself.

Figure 4:
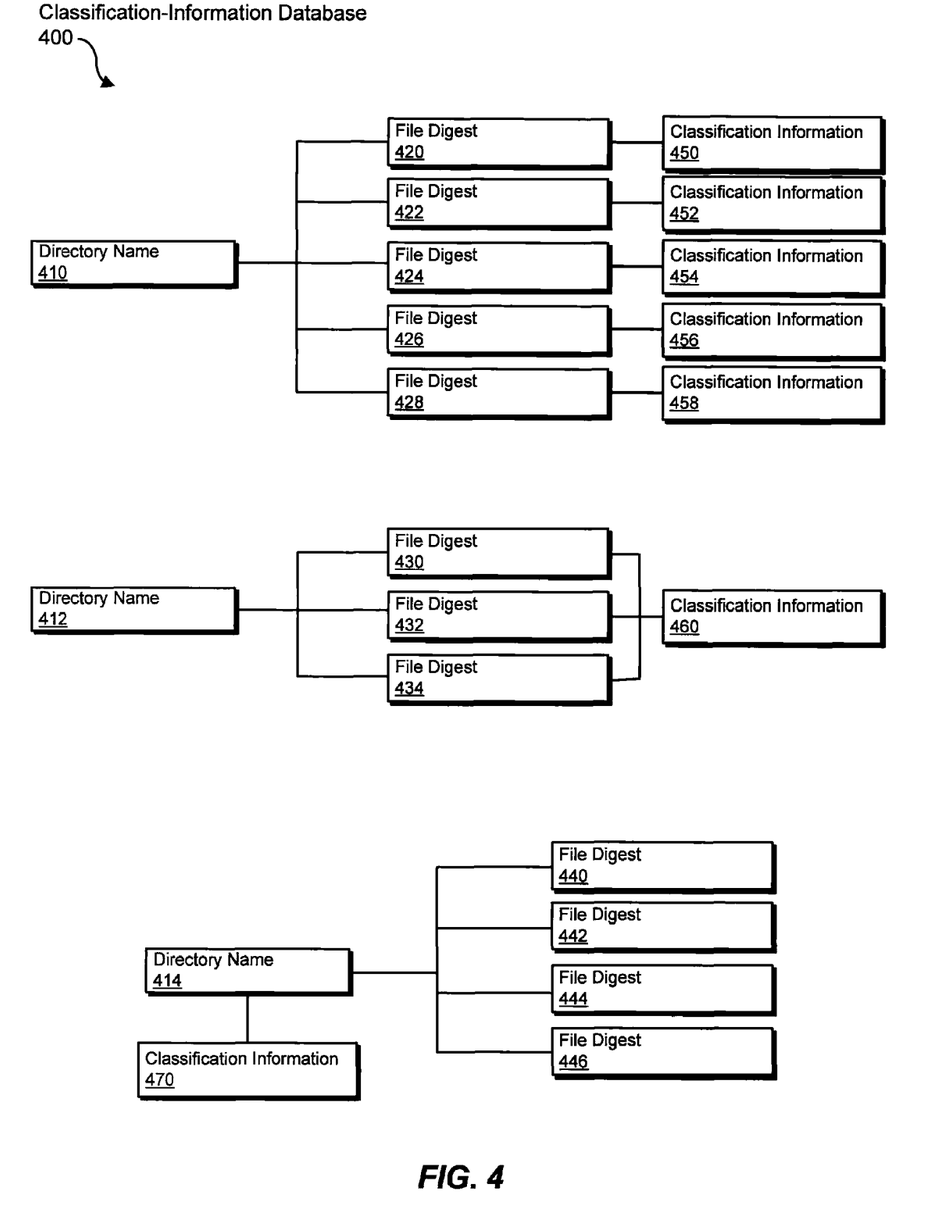
FIG. 4 is a block diagram of an exemplary classification-information database according to certain embodiments.

Security software 122 may send the identification information for file 130 to server 150 to query classification-information database 152 for classification information for file 130. FIG. 4 and the corresponding description provide an example of a classification database and how a classification database may be created. Server 150 may search classification-information database 152 for classification information associated with file 130. In some embodiments, server 150 may search classification-information database 152 for a digest that matches the digest of file 130. Server 150 may find that digest 162 matches the digest of file 130.

In some embodiments, before searching classification-information database 152 for a digest that matches the digest of file 130, server 150 may search a classification-information database for a directory name that matches the directory name of directory 128. For example, server 150 may determine that directory name 160 matches the directory name for directory 128. After identifying a directory in classification-information database 152 that matches the directory name of directory 128, server 150 may search files associated with the directory for a digest that matches the digest of file 130.

Classification-information database 152 may identify additional file digests that are associated with file 130. For example, classification-information database 152 may identify file digests 164 and 166 because file digests 164 and 166 are also associated with directory name 160. Classification-information database 152 may transmit digests 164 and 166 to security software 122 on client 120. Classification-information database 152 may also transmit classification information 170, 172, and 174 to security software 122.

After receiving identification information for the additional files, security software 122 may determine whether these additional files are included in directory 128. For example, security software 122 may determine whether digests 164 and 166 match digests for files 132 and 134. As part of this determination process, security software 122 may calculate digests for files 132 and 134. In other embodiments, security software 122 may identify pre-calculated digests for files 132 and 134.

Security software 122 may determine that digest 164 corresponds to file 132 and digest 166 corresponds to file 134. Security software 122 may then apply classification information 172 to file 132 and classification information 174 to file 134. Security software 122 may also apply classification information 170 to file 130. If classification information 170, 172, and 174 indicate that files 130, 132, and 134 are trusted, security software 122 may apply classification information 170, 172, and 174 to files 130, 132, and 134 by excluding these files from a security scan. While FIG. 1 shows separate classification information for each file associated with (e.g., stored in) a directory, in some embodiments each file in a directory may be associated with the same classification information.

FIG. 1 shows that client 120 may include an application 126. Directory 128 may be a folder that was installed by and/or otherwise associated with application 126. Classification-information database 152 may comprise classification information for files installed by application 126. For example, a security module may monitor an installation of application 126 to determine which files are installed by application 126. The security module may then analyze and classify the files installed by application 126. The disclosure corresponding to FIG. 4 discusses the process of analyzing and classifying files.

Figure 2:
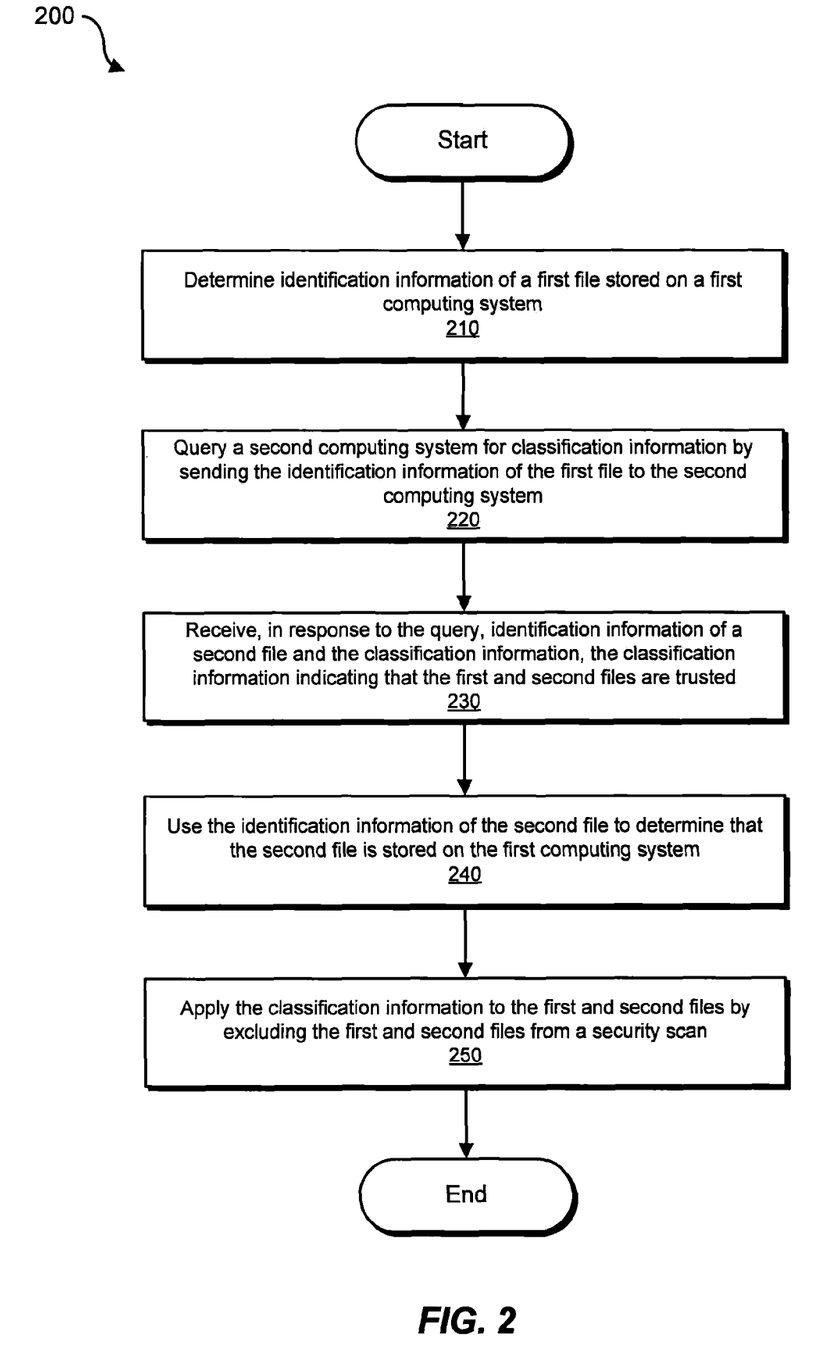
FIG. 2 is a flow diagram of an exemplary method for determining file classifications according to certain embodiments.

FIG. 2 is a flow diagram that illustrates steps that may be performed by a client device, such as client 120. Security software on the client device may determine identification information of a first file stored on a first computing system (step 210). Determining identification information of a first file may comprise computing a digest for the first file. A digest may be a file identifier such as a hash. A hash may be a value, code, sum, or other data calculated using a hash function (e.g., a function that takes an input of a data stream of any length and produces an output with a value of a certain fixed size). The hash function may be a cyclic redundancy check (CRC) hash function. In other embodiments, the hash function may be a cryptographic hash function, such as a message-digest algorithm 5 (MD5) hash function. The hash function may also be a secure hash algorithm (SHA) cryptographic hash function, such as a SHA-0, SHA-1, SHA-256, or SHA-512 hash function. A hash of the first file may also be computed by applying any other public or private hash algorithm to the first file.

Determining identification information of the first file may also comprise determining a directory where the first file is stored. For example, the security software may determine a directory name of a directory where the first file is stored. The directory name may be a file path of the directory. In some embodiments, the directory name may be a normalized directory path created by converting an absolute directory path for a specific machine to a generic directory path that eliminates the machine-specific components of the directory path. In other words, a normalized directory path may be created by removing the data in a directory path that is specific to a client machine but keeping the parts of the directory path that would be generic to any machine where the directory may be installed.

The security software, after determining identification information of the first file, may query a second computing system (e.g., a server) for classification information (step 220). The security software may query the second computing system by sending identification information of the first file to the second computing system. For example, the security software may send a digest and directory name for the first file to a classification-information database on the second computing system.

The first computing system may receive, in response to the query, identification information of a second file (step 230). The identification information of the second file may be a file name of the second file, the size of the second file, a digest of the second file, and/or any other identification information for the second file. The first computing system may also receive classification information for the first and second files (step 230). The classification information may be classification information that designates whether the first and second files are trusted. In some embodiments, the classification information may be a single classification associated with both files that indicates whether the files are trusted. In other embodiments, the first computing device may receive different classification information for each of the first and second files.

The security software may use the identification information of the second file to determine that the second file is stored on the first computing system (step 240). Using the identification information of the second file to determine that the second file is stored on the first computing device may comprise determining that the first computing device comprises a file with the file name of the second file and determining that the digest of the second file matches the digest of the file with the file name of the second file. In other words, the security software may first check the first computing device to determine whether the first computing device has a file with a name that matches the name received from the second computing system. If the security software finds a file name match, the security software may compare a hash of the file on the first computing device with the hash received from the second computing device. If the hashes match, the security software may determine that the file on the first computing device is the file identified by the second computing device (i.e., the first computing device comprises the second file).

In some embodiments, the identification information of the second file may comprise a size of the second file. In such embodiments, using the identification information of the second file to determine that the second file is stored on the first computing device may comprise determining that the file with the file name of the second file is the same size as the second file. In other words, the security software may determine that the file is the second file by determining that the file is the same size as the second file, by determining that the hash functions of the files match, and/or by determining that the files have the same name.

The security software may apply the classification information to the first and second files by excluding the first and second files from a security scan (step 250). For example, the security software may include the first and second files in a list of trusted files. The security software may skip files identified in the list of trusted files when performing a security scan.

In some embodiments, step 210 (determining identification information of a first file) may comprise determining identification information of multiple files. For example, security software may determine identification information of a few files (or many files) in a directory, where the directory comprises a set of files. Thus, the security software may determine identification information for a subset of files in the directory, and the subset of files may comprise the first file. In such embodiments, step 220 may comprise sending the identification information of each file in the subset of files to the second computing system. The second computing system may be able to more quickly and accurately determine other files in a set of associated files by receiving multiple files from the set of files rather than receiving only a single file from the set of files.

In some embodiments, step 230 (receiving identification information of a second file) may comprise receiving identification information for a set of files. The set of files may comprise the second file. The set of files may comprise each file associated with the directory in which the first file is stored.

Figure 3:
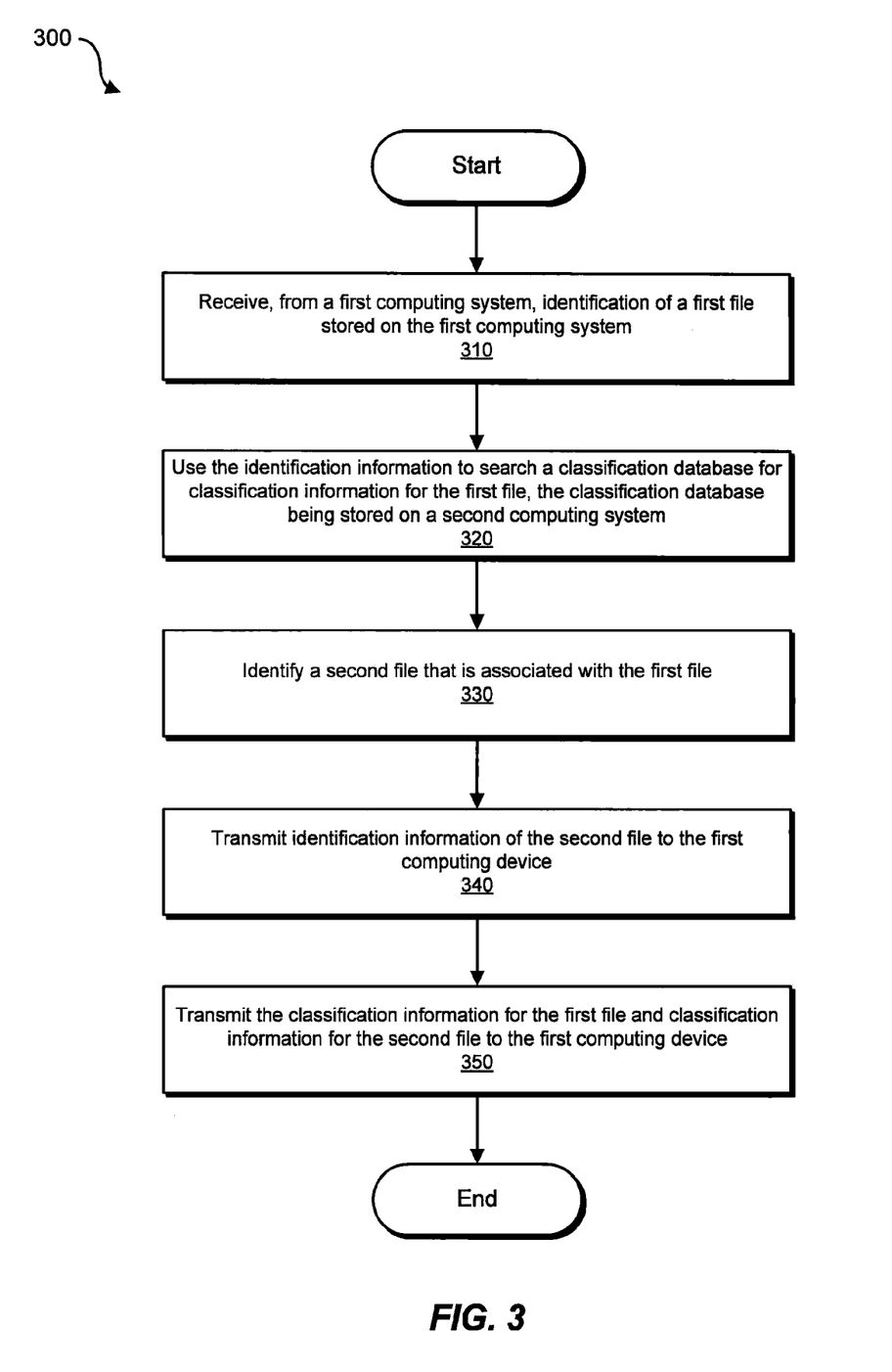
FIG. 3 is a block diagram of another exemplary method for determining file classifications according to certain embodiments.

FIG. 3 shows a flow diagram of a computer-implemented method for determining file classifications. The steps shown in FIG. 3 may be performed by a server (e.g., a second computing system) in communication with a client that is requesting classification information for files. The second computing system may receive identification information of a first file from a first computing system (step 310). The first file may be a file stored on the first computing system. The second computing system may use the identification information to search a classification database for classification information for the first file (step 320). The classification database may be stored on the second computing system. As previously discussed, the second computing system may search the classification database for classification information of the first file by searching the classification database for a digest and/or directory that matches a digest and/or directory of the first file.

After identifying the first file in the classification database, the second computing system may identify a second file that is associated with the first file (step 330). The second computing system may identify files associated with the first file by searching for files that are associated with the same directory as the first file. In other words, the first file may be associated with the second file if the first and second files are stored in the same directory.

The second computing system may transmit identification information of the second file to the first computing device (step 340). As previously mentioned, the identification information of the second file may comprise a digest of the second file, a name of the second file, a size of the second file, and/or any other information that identifies the second file or may distinguish the second file from other files. The second computing system may transmit the classification information for the first file, as well as classification information for the second file, to the first computing device (step 350).

While steps 340 and 350 are shown as separate steps, the second computing device may perform steps 340 and 350 at the same time. In other words, the second computing device may transmit identification information and classification information at the same time. In some embodiments, the second computing device may identify a set of files associated with the first file, and the set of files may comprise the second file. The second computing device may transmit identification information and classification information for each file in the set of files to the first computing device.

FIG. 4 shows a classification-information database 400. Classification-information database 400 may associate directories with files. Classification-information database 400 may associate directories with files by associating directory names of directories with file digests for files. For example, a directory name 410 may be associated with file digests 420, 422, 424, 426, and 428. A directory name 412 may be associated with file digests 430, 432, and 434. A directory name 414 may be associated with the file digests 440, 442, 444, and 446.

Classification-information database 400 may also associate files with classification information. For example, file digest 420 may be associated with classification information 450, file digest 422 may be associated with classification information 452, file digest 424 may be associated with classification information 454, file digest 426 may be associated with classification information 456, and file digest 428 may be associated with classification information 458. File digests 430, 432, and 434 may be associated with classification information 460. In some embodiments, classification information may be associated with a directory. For example directory 414 may be associated with classification information 470. Thus, any file associated with directory 414 may also be associated with classification information 470. Classification information 470 therefore applies to file digest 440, file digest 442, file digest 444, and file digest 446.

When a client queries classification-information database 400 for classification information for a file, classification-information database 400 may search for a file digest that matches the file on the client Once classification-information database 400 finds a matching file digest, classification-information database 400 may return classification information associated with the digest to the client. Classification-information database 400 may also return other file digests associated with the file on the client.

As an example, a client may query classification-information database 400 with a first digest. Classification-information database 400 may determine that the first digest matches file digest 424. Classification-information database 400 may return classification information 454 for file digest 424. Classification-information database 400 may also return file digests 420, 422, 426, and 428 and their corresponding classification information to the client.

Classification-information database 152 may be created or populated using a classification tool. The classification tool may monitor the installations of software applications and classify the files installed by the software applications. For example, after identifying a set of files installed by an application, the files may be scanned for malware. The files may be classified based on the likelihood that they contain malware. The files and their corresponding classification information may be uploaded to a client-facing database system, such as classification database 400.

Figure 5:
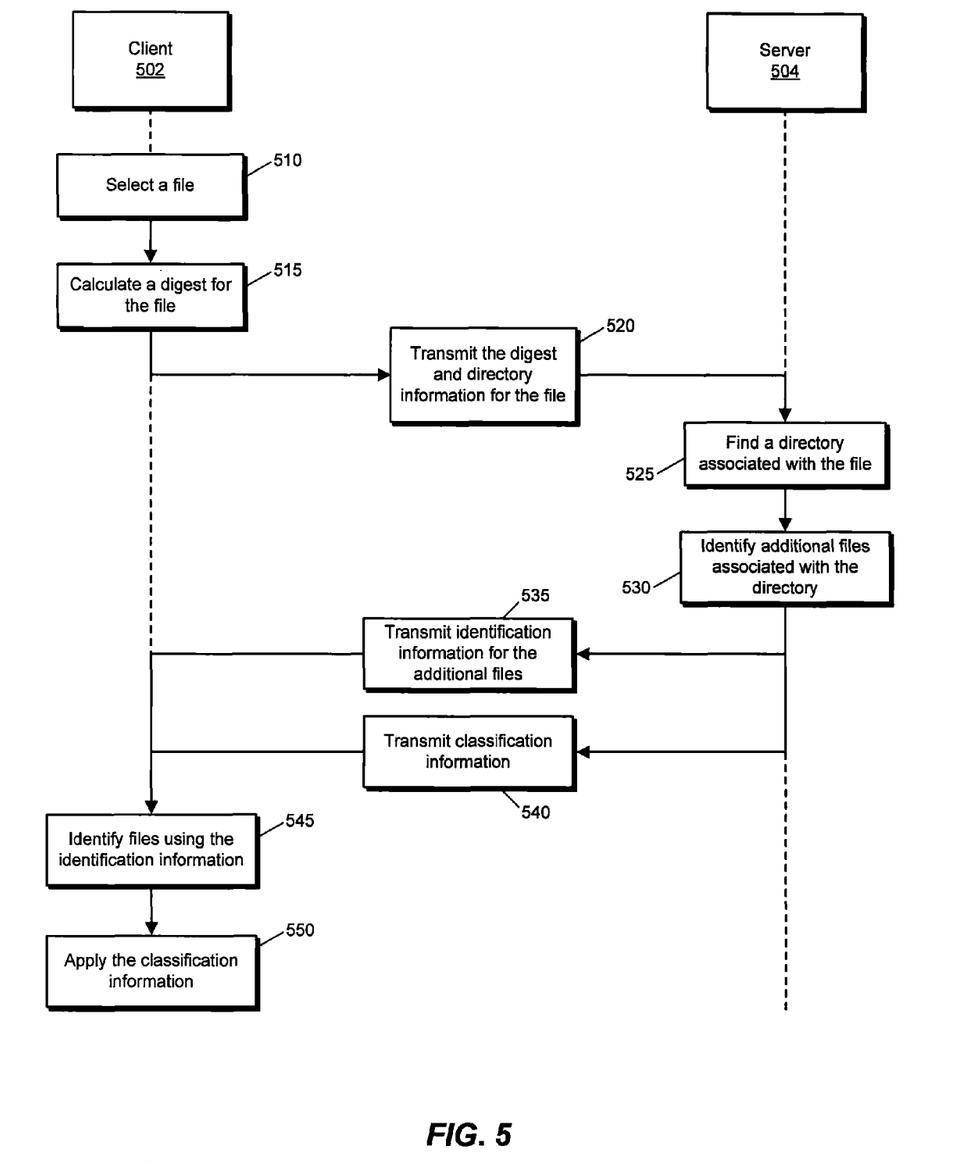
FIG. 5 is a flow diagram of exemplary communications between a client and a server according to certain embodiments.

FIG. 5 illustrates a flow diagram that shows communication between client 502 and server 504. Client 502 may select a file (step 510). Client 502 may then calculate a digest for the file (step 515). Client 502 may transmit a digest and directory information for the file to server 504 (step 520). Server 504 may find a directory associated with the file (step 525). Server 504 may also identify additional files associated with the directory (step 530). Server 504 may transmit identification information for the additional files to client 502 (step 535). At the same time (or at a different time), server 504 may transmit classification information for the original file and the additional files to client 502 (step 540). Client 502 may receive the information from server 504 and identify files using the identification information (step 545). Then, client 502 may apply the classification information to the files (step 550).

Figure 6:
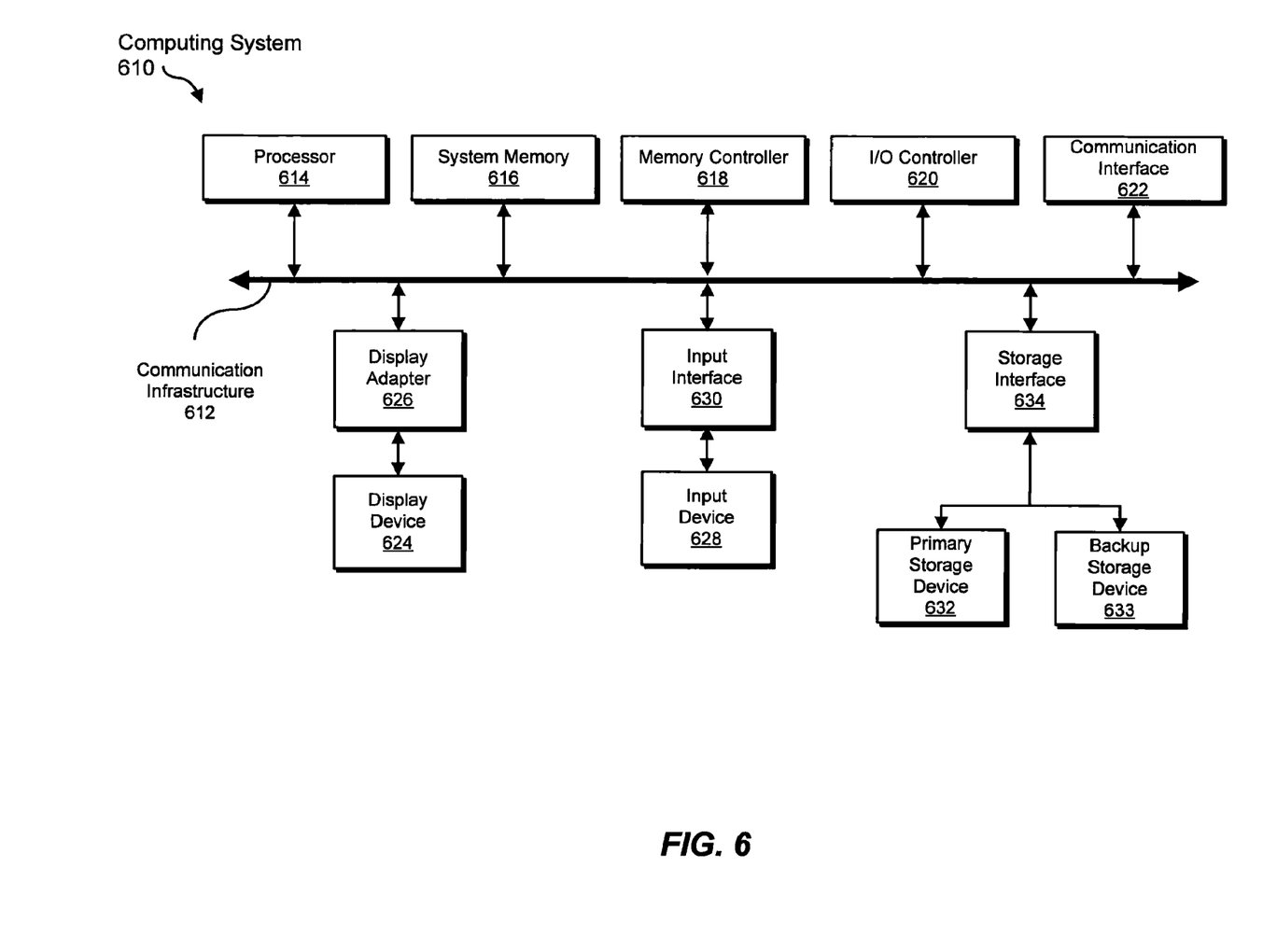
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the determining, calculating, identifying, applying, using, querying, receiving, and/or transmitting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (e.g., system memory 616) and a non-volatile storage device (e.g., primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as determining, calculating, identifying, applying, using, querying, receiving, and/or transmitting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the determining, calculating, identifying, applying, using, querying, receiving, and/or transmitting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the determining, calculating, identifying, applying, using, querying, receiving, and/or transmitting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the determining, calculating, identifying, applying, using, querying, receiving, and/or transmitting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the determining, calculating, identifying, applying, using, querying, receiving, and/or transmitting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
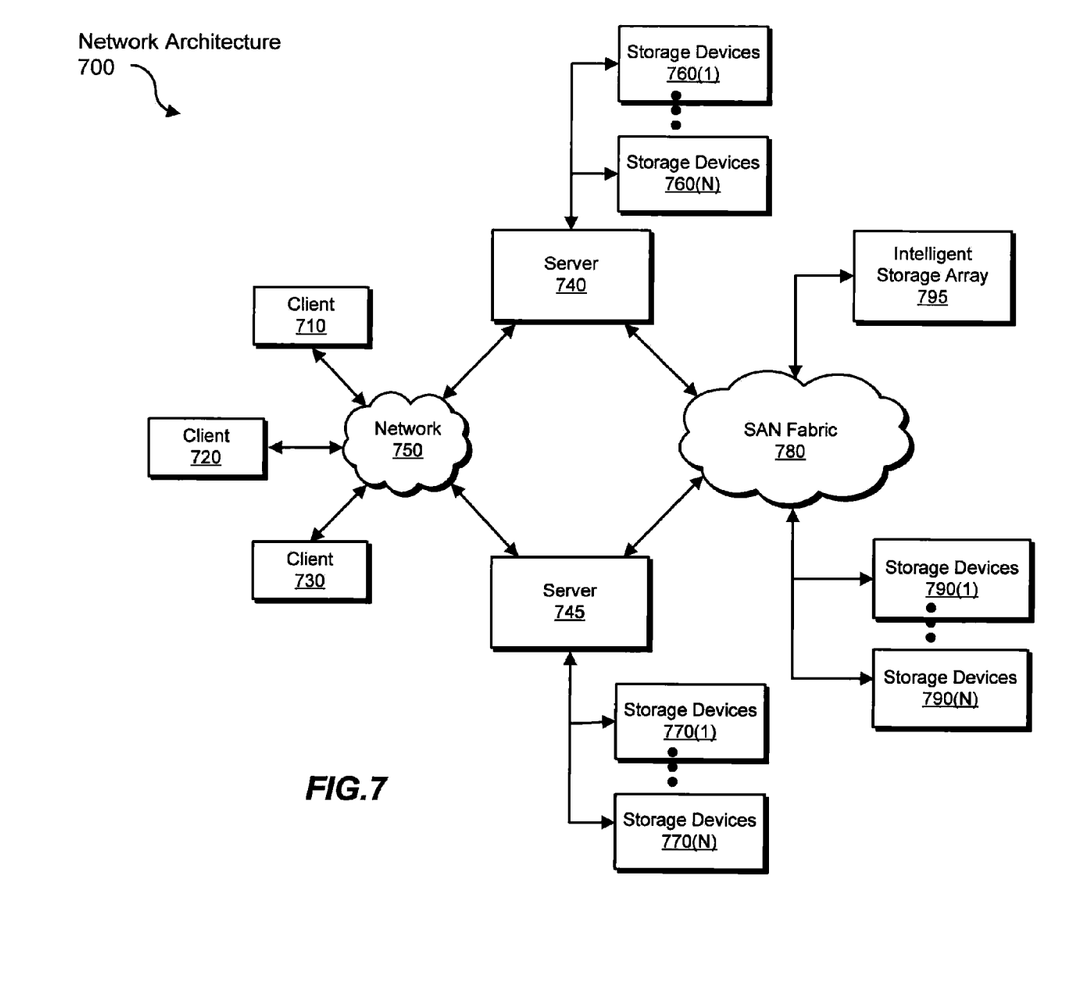
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the determining, calculating, identifying, applying, using, querying, receiving, and/or transmitting steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, a computer-implemented method for determining file classifications may comprise determining identification of a first file stored on a first computing system. The method may also comprise querying a second computing system for classification information by sending the identification information of the first file to the second computing system. The method may also comprise receiving identification information of a second file and receiving the classification information. Classification information may indicate that the first and second files are trusted. The method may comprise using the identification information of the second file to determine that the second file is stored on the first computing system. The method may further comprise applying the classification information to the first and second files by excluding the first and second files from a security scan.

In some embodiments, determining identification information of the first file may comprise calculating a digest of the first file. In at least one embodiment, the identification information of the first file may comprise the digest of the first file, and the identification information of the first file may comprise the name of a directory where the first file is stored.

According to various embodiments, the digest may comprise a hash of the first file and the name of the directory where the first file is stored may comprise a normalized directory path. According to various embodiments, the identification information of the second file may comprise a file name of the second file and the digest of the second file. Using the identification information of the second file to determine that the second file is stored on the first computing system may comprise determining that the first computing device comprises a file with the file name of the second file and that the digest of the second file matches the digest of the file with the file name.

In various embodiments, the identification information of the second file may comprise the size of the second file. Using the identification information of the second file to determine that the second file is stored on the first computing device may comprise determining that the file with the file name of the second file is the same size as the second file.

According to various embodiments, the first file is installed on the first computing device by a first software program and the second file was also installed on the first computing device by the first software program. In at least one embodiment, the method may comprise receiving identification information for each file in a set of files. A set of files may be associated with an application that installed the first file. The set of files may comprise a second file. The method may also comprise receiving classification information for each file in the set of files. According to certain embodiments, the method may further comprise determining identification information of each file in a subset of files. The subset of files may comprise the first file. The subset of files may be a subset of the set of files associated with the application. The method may also comprise querying the second computing system for identification information by sending the identification information of each file in the subset of files to the second computing system.

In certain embodiments, a computer-implemented method for determining file classifications may comprise receiving identification information of a first file stored on the first computing system. The method may also comprise using the identification information to search a classification database for classification information of the first file. The classification database may be stored on a second computing system. The method may comprise identifying a second file that is associated with the first file and transmitting identification information of the second file to the first computing system. The method may further comprise transmitting the classification information for the first file and classification information for the second file to the first computing system.

In some embodiments, the identification information of the first file may comprise a digest of the first file. The identification information of the first file may also comprise a name of the directory where the first file is stored. According to various embodiments, the digest may comprise a hash of the first file. The name of the directory where the first file is stored may comprise a normalized directory path.

In some embodiments, the first file may be installed on the first computing device by a first software program. In various embodiments, identifying the second file may comprise using the name of the directory where the first file is stored to find a directory associated with the first software program. In some embodiments, identifying the second file may comprise determining that the directory associated with the first software program may include the second file.

According to at least one embodiment, the identification information of the second file may comprise at least one of the file names of the second file, the size of the second file, and a digest of the second file. The method may also comprise transmitting identification information for each file in a set of files. The set of files may be associated with an application that installed the first file. The method may also comprise receiving classification information for each file in the set of files. According to various embodiments, the method may further comprise receiving identification information for each file in a subset of files. The identification information may be received from the first computing system. The subset of files may comprise the first file, and the subset of files may be a subset of the set of files associated with the application.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with, and have the same meaning as, the word "comprising."

We claim:

1. A computer-implemented method for determining file classifications, the computer-implemented method comprising:
   determining identification information of a first file stored on a first computing system;
   querying a second computing system for classification information by sending the identification information of the first file to the second computing system;
   receiving, in response to the query, identification information of a second file and the classification information, the classification information indicating that the first and second files are trusted;
   using the identification information of the second file to determine that the second file is stored on the first computing system;
   applying the classification information to the first and second files by excluding the first and second files from a security scan.

2. The computer-implemented method of claim 1, wherein:
   determining identification information of the first file comprises calculating a digest of the first file;
   the identification information of the first file comprises the digest of the first file;
   the identification information of the first file comprises a name of a directory where the first file is stored.

3. The computer-implemented method of claim 2, wherein:
   the digest comprises a hash of the first file;
   the name of the directory where the first file is stored comprises a normalized directory path.

4. The computer-implemented method of claim 1, wherein:
   the identification information of the second file comprises a file name of the second file and a digest of the second file;
   using the identification information of the second file to determine that the second file is stored on the first computing system comprises:
      determining that the first computing system comprises a file with the file name of the second file;
      determining that the digest of the second file matches a digest of the file with the file name.

5. The computer-implemented method of claim 4, wherein:
   the identification information of the second file comprises a size of the second file;
   using the identification information of the second file to determine that the second file is stored on the first computing system comprises:
      determining that the file with the file name of the second file is the same size as the second file.

6. The computer-implemented method of claim 1, further comprising:
   receiving identification information for each file in a set of files, wherein:
      the set of files is associated with an application that installed the first file;
      the set of files comprises the second file;
   receiving classification information for each file in the set of files.

7. The computer-implemented method of claim 6, further comprising:
   determining identification information of each file in a subset of files, wherein:
      the subset of files comprises the first file;
      the subset of files is a subset of the set of files associated with the application;
   querying the second computing system for classification information by sending the identification information of each file in the subset of files to the second computing system.

8. The computer-implemented method of claim 1, wherein:
   the first file was installed on the first computing system by a first software program;
   the second file was installed on the first computing system by the first software program.

9. A computer-implemented method for determining file classifications, the computer-implemented method comprising:
   receiving, from a first computing system, identification information of a first file stored on the first computing system;
   using the identification information to search a classification database for classification information for the first file, the classification database being stored on a second computing system;
   identifying a second file that is associated with the first file;
   transmitting identification information of the second file to the first computing system;
   transmitting the classification information for the first file and classification information for the second file to the first computing system, wherein the first computing system uses the identification information of the second file to determine that the second file is stored on the first computing system and applies the classification information to the first and second files by excluding the first and second files from a security scan.

10. The computer-implemented method of claim 9, wherein:
    the identification information of the first file comprises a digest of the first file;
    the identification information of the first file comprises a name of a directory where the first file is stored.

11. The computer-implemented method of claim 10, wherein:
    the digest comprises a hash of the first file;
    the name of the directory where the first file is stored comprises a normalized directory path.

12. The computer-implemented method of claim 10, wherein:
    the first file was installed on the first computing system by a first software program;
    identifying the second file comprises using the name of the directory where the first file is stored to find a directory associated with the first software program;

identifying the second file comprises determining that the directory associated with the first software program includes the second file.

13. The computer-implemented method of claim 9, further comprising:
    transmitting identification information for each file in a set of files, wherein:
        the set of files is associated with an application that installed the first file;
        the set of files comprises the second file;
    receiving classification information for each file in the set of files.

14. The computer-implemented method of claim 13, further comprising:
    receiving, from the first computing system, identification information for each file in a subset of files, wherein:
    the subset of files comprises the first file;
    the subset of files is a subset of the set of files associated with the application.

15. The computer-implemented method of claim 9, wherein:
    the identification information of the second file comprises at least one of:
    a file name of the second file;
    a size of the second file;
    a digest of the second file.

16. A non-transitory computer-readable medium comprising one or more computer-executable instructions that, when executed by a computing device, cause the computing device to:
    determine identification information of a first file stored on a first computing system;
    query a second computing system for classification information by sending the identification information of the first file to the second computing system;
    receive, in response to the query, identification information of a second file and the classification information, the classification information indicating that the first and second files are trusted;
    use the identification information of the second file to determine that the second file is stored on the first computing system;
    apply the classification information to the first and second files by excluding the first and second files from a security scan.

17. The computer-readable medium of claim 16, wherein the one or more computer-executable instructions, when executed by a computing device, cause the computing device to:
    calculate a digest of the first file, wherein:
        the identification information of the first file comprises the digest of the first file.

18. The computer-readable medium of claim 17, wherein:
    the digest comprises a hash of the first file;
    the identification information of the first file comprises a name of a directory where the first file is stored;
    the name of the directory where the first file is stored comprises a normalized directory path.

19. The computer-readable medium of claim 16, wherein:
    the identification information of the second file comprises a file name of the second file and a digest of the second file.

20. The computer-readable medium of claim 19, wherein the one or more computer-executable instructions, when executed by a computing device, cause the computing device to:
    determine that the first computing system comprises a file with the file name of the second file;
    determine that the digest of the second file matches a digest of the file with the file name.

* * * * *